(12) United States Patent
Voigtmann et al.

(10) Patent No.: US 7,156,219 B2
(45) Date of Patent: Jan. 2, 2007

(54) INSTALLATION FOR ASSEMBLING TUBE COMPONENTS

(75) Inventors: Jean-Pierre Voigtmann, Martigny (CH); Jean-Claude Schwager, Collombey (CH); Mathieu Benoit, Jongny (CH); Didier Ferrin, Collonges (CH)

(73) Assignee: Aisapack Holding S.A., Vouvry (CH)

( * ) Notice: Subject to any disclaimer, the term of this patent is extended or adjusted under 35 U.S.C. 154(b) by 210 days.

(21) Appl. No.: 10/497,185

(22) PCT Filed: Nov. 27, 2002

(86) PCT No.: PCT/CH02/00642

§ 371 (c)(1),
(2), (4) Date: Dec. 8, 2004

(87) PCT Pub. No.: WO03/045654

PCT Pub. Date: Jun. 5, 2003

(65) Prior Publication Data

US 2005/0082142 A1    Apr. 21, 2005

(30) Foreign Application Priority Data

Nov. 30, 2001  (CH) .......................... 2001 2197/01

(51) Int. Cl.
*B65G 17/32* (2006.01)

(52) U.S. Cl. ................. 198/377.04; 198/408; 198/412; 198/471.1; 198/478.1

(58) Field of Classification Search ........... 198/377.04, 198/408, 412, 471.1, 478.1
See application file for complete search history.

(56) References Cited

U.S. PATENT DOCUMENTS

| 2,427,712 | A | * | 9/1947 | Casler et al. ............. 198/471.1 |
| 3,319,764 | A | * | 5/1967 | Gamberini ............. 198/377.04 |
| 3,563,377 | A |   | 2/1971 | Southcott |
| 3,628,451 | A | * | 12/1971 | McClellan et al. ............. 101/4 |
| 3,952,865 | A | * | 4/1976 | Rudszinat et al. ..... 198/377.04 |
| 4,690,050 | A | * | 9/1987 | Rouly et al. ................... 101/35 |
| 4,938,337 | A | * | 7/1990 | Jowitt et al. ........... 198/377.03 |
| 5,327,803 | A | * | 7/1994 | deMey, III .................... 83/152 |
| 5,647,190 | A | * | 7/1997 | Minarelli et al. ............. 53/446 |
| 6,098,785 | A | * | 8/2000 | Van Maanen ............ 198/459.8 |

* cited by examiner

*Primary Examiner*—Joe Dillon, Jr.
(74) *Attorney, Agent, or Firm*—Nixon & Vanderhye P.C.

(57) ABSTRACT

Installation for assembling tube components, particularly bodies (1) with shoulders, comprising the following elements arranged in succession: a linear body conveyor (4), a transfer system (7) designed to apply a change in orientation to the bodies (1) of about 90°, an assembly unit (8) for fixing the shoulders to the bodies (1), characterized in that the transfer system (7) consists of a device (9) for gripping the bodies and of a device (17) for changing the orientation of the bodies, the orientation-change device comprising a rotary conveyor (17), of the conveyor belt type, which is arranged at right angles to the direction of the linear conveyor (4), the said rotary conveyor (17) comprising a belt (18, 19) rotating about a direction that makes an angle of about 45° with the direction of the linear conveyor (4), the belt (18, 19) comprising elements (15) for grasping the bodies, the shape of which is designed so that the bodies (1) are initially grasped on one of the sides of the rotary conveyor (17), in a direction parallel to that of the linear conveyor (4), and that they undergo a change in orientation by 90° when they pass to the other side of the rotary conveyor (17).

7 Claims, 4 Drawing Sheets

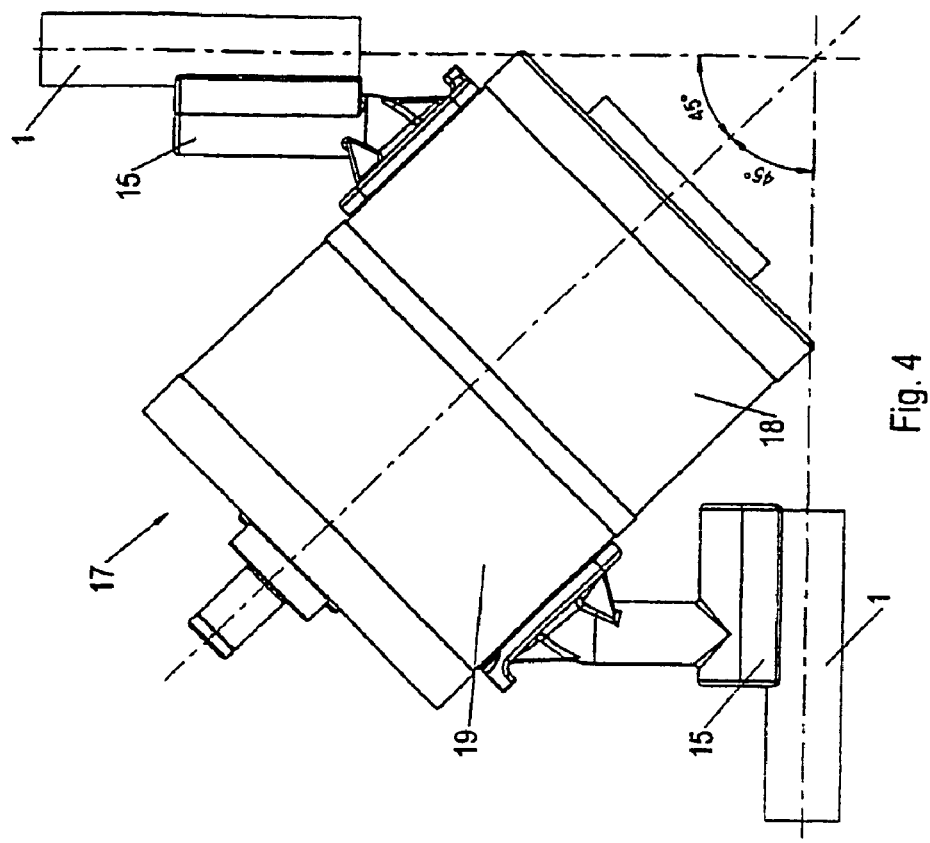
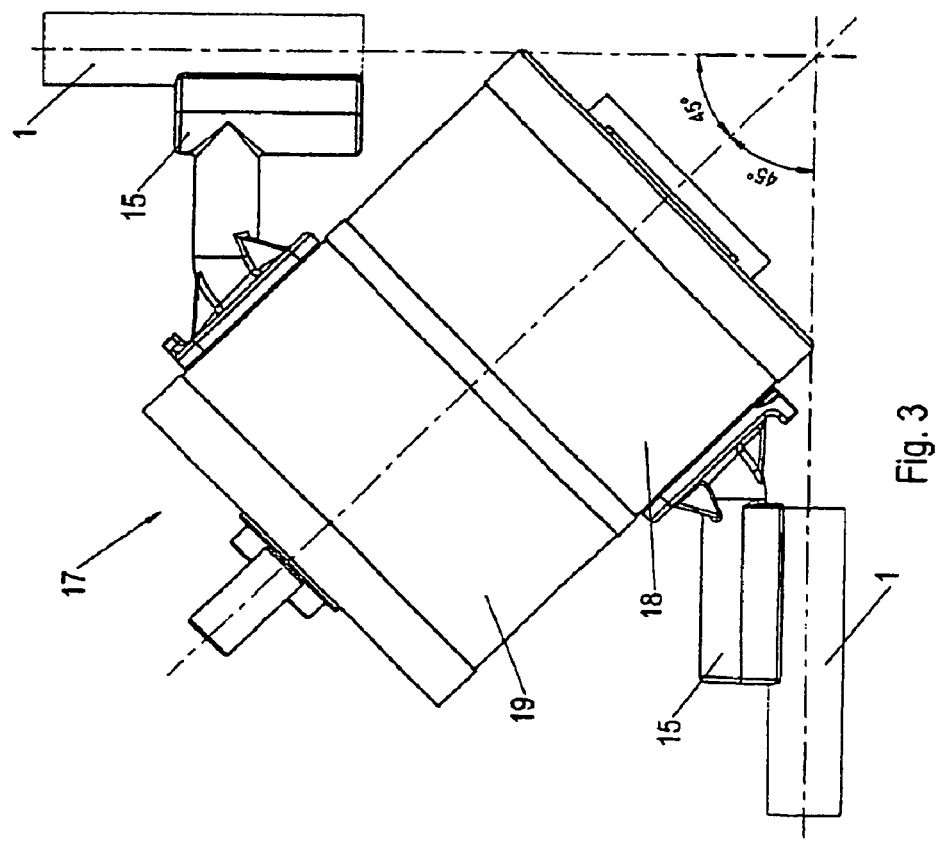

INSTALLATION FOR ASSEMBLING TUBE COMPONENTS

This application is the US national phase of international application PCT/CH02/00642 filed 27 Nov. 2002 which designated the U.S. and claims benefit of CH 2197/01, dated 30 Nov. 2001, the entire content of which is hereby incorporated by reference.

FIELD OF THE INVENTION

The present invention relates to an installation for assembling tube components such as bodies, shoulders or caps.

It relates more specifically to a system for transferring bodies so that they can be fixed to shoulders.

STATE OF THE ART

Usually, tube assembly installations comprise a first unit which prepares bodies from a sheet of plastic. The bodies are then conveyed on a linear conveyor and reach a transfer system which alters their orientation, it being possible for the change in orientation to be by 90°. Once this operation has been performed, the shoulders are fixed onto one end of the bodies.

Patent document EP 0 175 642 describes a transfer system in which the change in orientation is performed by a bevel wheel which grasps the bodies. The wheel is arranged in such a way that, as it rotates, the bodies undergo a change in orientation that may be by as much as 90°.

The installations of the prior art, aside from their relatively large size, do not allow a high number of tubes to be processed per unit time, for example 300 tubes per minute. This is particularly the result of the fact that the orientation of the bodies has to be changed before the bodies can be fixed to the shoulders.

SUMMARY OF THE INVENTION

The present invention aims in particular to remedy the aforementioned problems.

It relates to an installation for assembling tube components, particularly bodies with shoulders, comprising the following elements arranged in succession: a linear body conveyor, a transfer system designed to apply a change in orientation to the bodies of about 90°, an assembly unit for fixing the shoulders to the bodies, characterized in that the transfer system consists of a device for gripping the bodies and of a device for changing the orientation of the bodies, the orientation-change device comprising a rotary conveyor, of the conveyor belt type, which is arranged at right angles to the direction of the linear conveyor, the said rotary conveyor comprising a belt rotating about a direction that makes an angle of about 45° with the direction of the linear conveyor, the belt comprising elements for grasping the bodies, the shape of which is designed so that the bodies are initially grasped on one of the sides of the rotary conveyor, in a direction parallel to that of the linear conveyor, and that they undergo a change in orientation by 90° when they pass to the other side of the rotary conveyor.

According to a preferred embodiment of the invention, the grasping elements are of roughly parallelepipedal shape, of which one face, the grasping face, is convex, the curvature of the grasping face being roughly the same as the curvature of the external surface of the bodies so that the latter are pressed as well as possible against the grasping face, the grasping elements being oriented in a direction that makes an angle of about 45° with the surface of the belt.

As a preference, in order to obtain a high processing rate, the rotary conveyor comprises two belts arranged in parallel, each belt comprising a group of body-grasping elements, the conveyor being designed so that the said groups are arranged in phase opposition.

Naturally, a high number of belts arranged in parallel may be anticipated.

Advantageously, the body-gripping device comprises a wheel provided with a number of gripping elements, the linear conveyor being arranged near the wheel at a tangent to it, the region thus defined representing the site at which the bodies are gripped, the gripping elements being arranged in a direction parallel to that of the linear conveyor.

According to an alternative form of the invention, the grasping elements and/or the gripping elements comprise means allowing suction and optionally blowing to be performed, this being so as to allow the bodies to be fixed (sucked) or released (blown) effectively.

As will be seen hereinafter, the installation according to the invention offers the following advantages in particular, over the installations of the prior art:

Considered in its entirety, the installation is relatively compact.

The tube-processing rate is increased. Over 300 tubes per minute can be processed according to the configuration of the installation.

There are a reduced number of parts in contact with the tubes during the processing operations, hence reducing the risks of contaminating or deforming the tubes.

There is good operational reliability. There is no partial transfer under gravity, hence the risk of the installation jamming is reduced and losses are correspondingly reduced.

The tubes do not go through any random variation in angular orientation with respect to their axis. This offers the possibility of positioning precisely a cap the perimeter of which is asymmetric (having, for example, a tab), with respect to the tag situated on the body.

A number of exemplary embodiments of the invention are described hereinbelow by means of the following figures.

FIG. 3 shows, viewed from above, the orientation-change device in a particular position.

FIG. 4 shows, viewed from above, the orientation-change device in another particular position.

Figure 1:
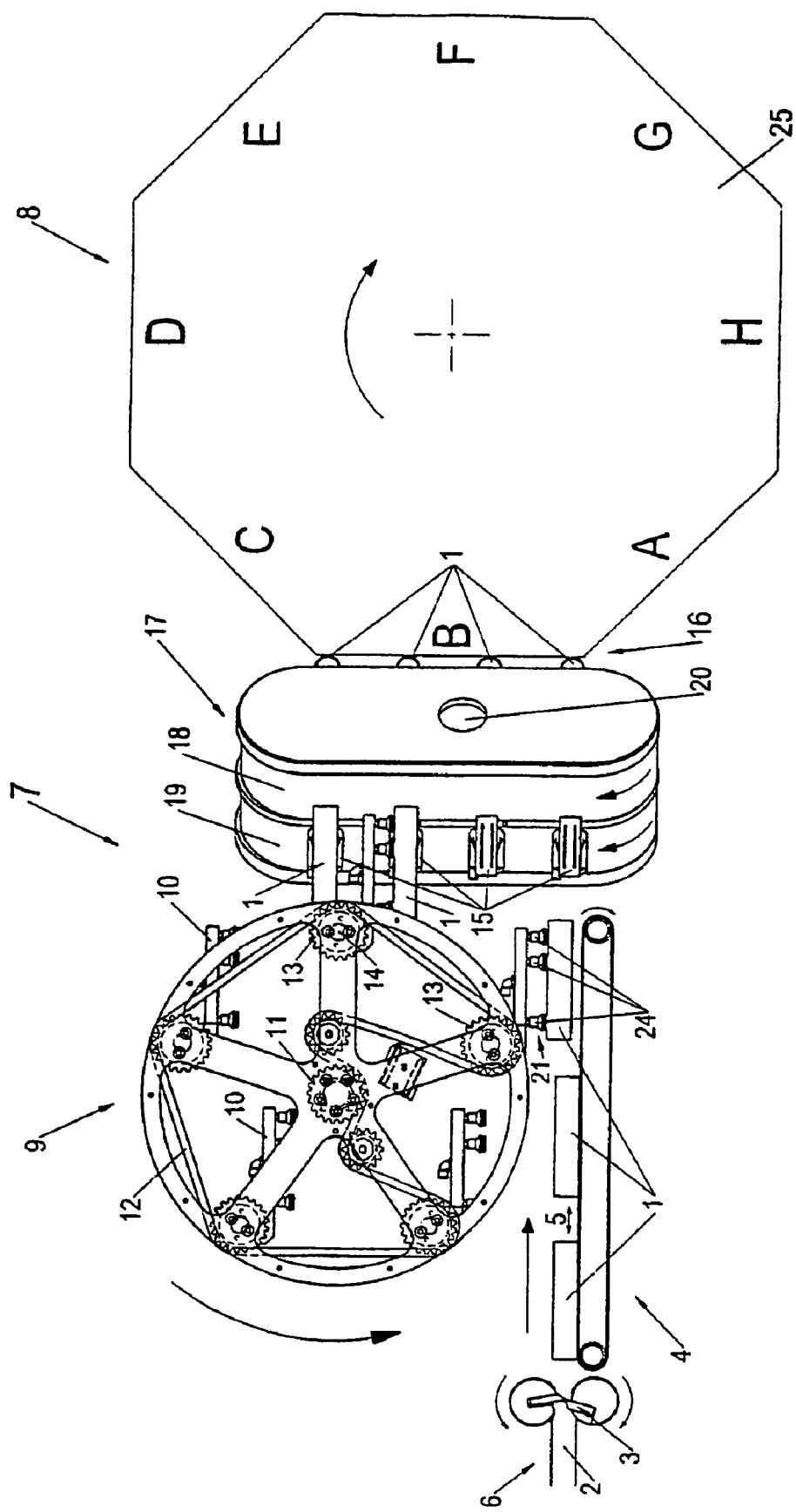
FIG. 1 depicts an installation according to the invention, viewed from the front.

The objects described in the examples carry the following references:
1. Body
2. Endless tube
3. Rotary cutter
4. Linear body conveyor
5. Space between two bodies on the linear conveyor
6. Machine for manufacturing bodies (body maker)
7. Transfer system
8. Assembly machine
9. Gripping system
10. Gripping element
11. Fixed central chain wheel
12. Chain
13. Chain wheel 14. Rolling bearing
15. Grasping element
16. Tube-loading station
17. Rotary conveyor
18. 1st belt
19. 2nd belt
20. Openings in the rotary conveyor
21. Region of transfer between the linear conveyor and the gripping system
22. Grasping face
23. Opening in the grasping face
24. Suction cup
25. Rotary polygon The bodies 1 are formed from a strip of plastic, in most cases multilayer, from a reel. By gradual forming in a bell with an internal mandrel and by lateral welding, an endless tube 2 is thus obtained (see FIG. 1). This method is a continuous process, the plastic strip is pulled through the various processing stations by means of belts which adhere to the outer surface of the endless tube 2 while the latter is surrounding the internal mandrel. A rotary cutter 3 cuts the endless tube 2 and thus forms bodies 1.

The bodies are then driven by a linear and horizontal conveyor 4 with a constant speed higher than the rate of travel of the endless tube 2, allowing the bodies 1 to be spaced out 5 as they travel along the conveyor 4. The machine 6 which produces tubes using this principle is commonly known as a body machine or body maker.

Downstream, a transfer system 7, described hereinbelow, feeds an assembly machine 8 with bodies 1. Unlike the linear conveyor 4 which operates continuously, the assembly machine 8 works discontinuously, with indexing. On each indexing event, it assembles, in succession, the elements that make up the tube and does so at workstations spread along a rotary polygon 25. As can be seen very schematically in FIG. 1, the assembly machine performs the following operations in succession:

A. Loading a shoulder
B. Loading a body
C. Preheating the shoulder
D. Welding the shoulder to the body
E. Welding on a membrane that closes off the orifice of the shoulder
F. Fitting the cap
G. Tightening the cap
H. Unloading the finished tube Having passed through the transfer system 7, the axis of the bodies 1 has undergone a change in orientation by 90°. On the linear conveyor 4, the bodies 1 travel parallel to the direction of travel of the linear conveyor 4 whereas when they are in the assembly machine 8 they move at right angles to this direction.

The result of this is that the installation has to meet the following requirement, essentially at the transfer system 7:

That of transferring tubes travelling at a constant speed, arriving regularly one after the other at a given rate, into a processing system (the assembly station 8) that processes the tubes in groups, of four in this instance, and to do so after having changed the orientation of the bodies 1 by 90° so as to allow the shoulders to be attached. From this requirement, it may be deduced in particular that the rate of the assembly machine 8, for four tubes processed simultaneously, needs to be four times lower than that of the bodies 1 arriving on the transfer system 7 from the linear conveyor 4. Another result of this is that, in this case, the assembly machine 8 has to perform a number of cycles the frequency of which is four times lower than the frequency at which the bodies 1 arrive at the transfer system 7.

Figure 2:
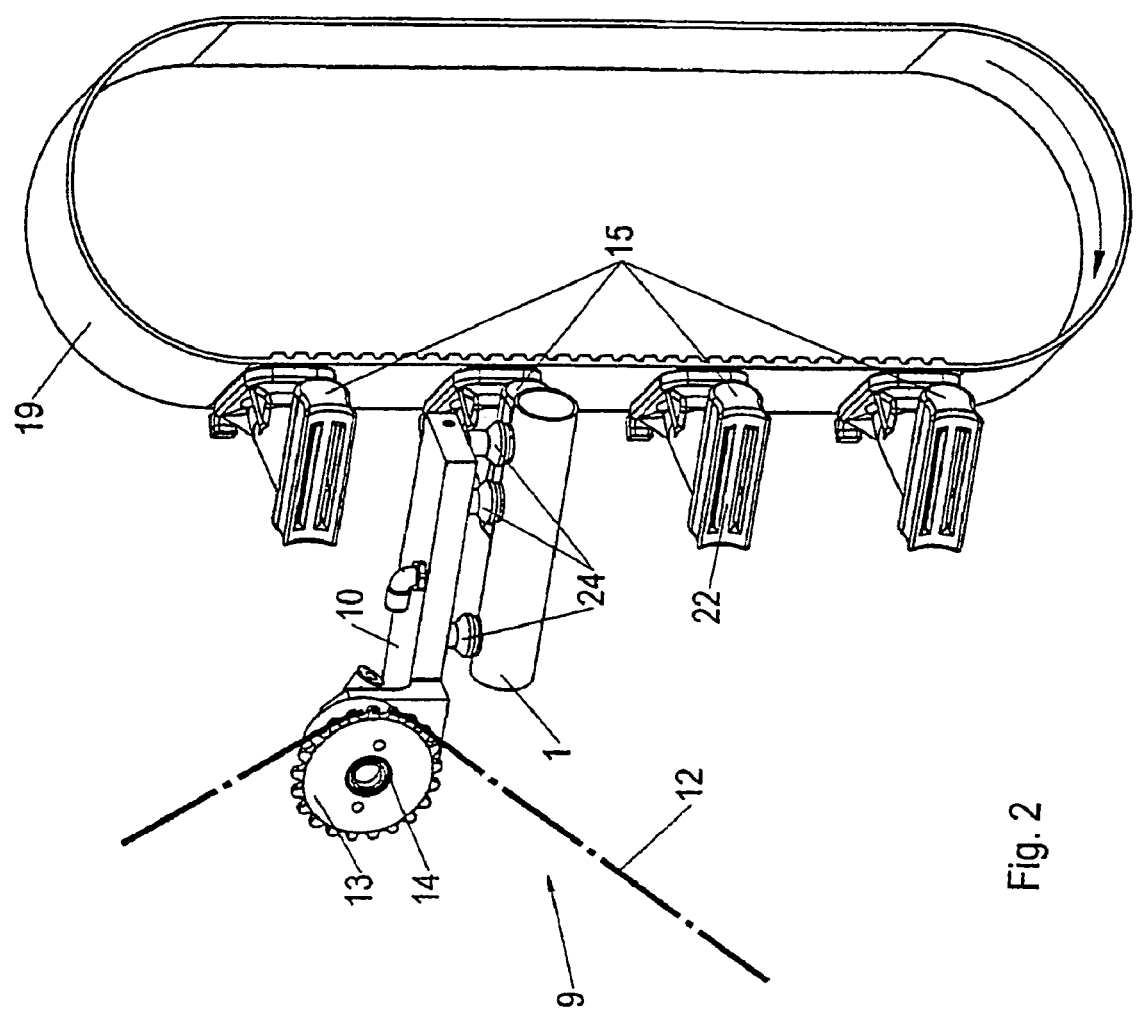
FIG. 2 depicts a simplified view of the transfer of a tube between the gripping device and the orientation-change device.

The requirements described above are satisfied by virtue of the following configuration: the transfer system comprises a wheel 9 with a number n of gripping elements 10 fixed in such a way as to maintain a direction always parallel to that of the linear conveyor as they rotate about the wheel 9. Each gripping element 10 consists of a longitudinal piece equipped with a group of suction cups 24 which are connected to a suction system and to a blowing system. The gripping elements 15 are held in a horizontal position while at the same time rotating in a circular path by means of a fixed central chain wheel 11, a chain 12 and chain wheels 13 housed on rolling bearings 14, the gripping elements being mounted on the chain wheels 13. In order to ensure that the bodies 1 are picked up properly by the gripping elements 10, the tangential speed of the wheel 9, more specifically at the gripping elements, needs to be equal to the linear speed of the bodies 1 as they travel along the linear conveyor 4. The bodies 1 are picked up in the 6 o'clock position (the wheel 9 is likened to a clock face). In the 3 o'clock position (see FIG. 2), the bodies 1 are grasped by grasping elements 15 arranged on the belts 18, 19 of the rotary conveyor 17, the latter acting as an orientation-change system as will be understood hereinafter. Just like the tangential speed of the wheel 9 and the speed of the linear conveyor 4, at this point, the rate of travel of the belts 18, 19 is the same as the tangential speed of the wheel 9. The two gripping systems, of the wheel 9 and of the rotary conveyor 17, are slaved by vacuum pumps through suction/blowing reversing valves. The passage from one gripping system to the next and the transfer of the bodies 1 from the rotary conveyor 17 to the assembly machine 8 are optimized by a very precise changeover between a suction or blowing mode of operation which is the reverse from one gripping system to the other. In fact, when the two gripping systems geometrically overlap in the 3 o'clock region where the instantaneous movements are very close in a small time window, there is a changeover from suction mode to blowing mode in one gripping system and vice versa in the other. Of course, the configuration of the two gripping systems needs to be such that each time a gripping element 10 passes through the 3 o'clock region, a grasping element 15 has to lie opposite it.

The rotary conveyor 17, arranged at right angles to the direction defined by the linear conveyor 4, conveys the bodies 1 to the assembly machine 8. The two belts 18, 19 of the rotary conveyor 17 rotate about a direction that makes an angle of 45° to the direction of the linear conveyor 4.

Each belt 18, 19 is equipped with a group of four grasping elements 15 arranged close together. The two belts 18, 19, as can be seen from FIGS. 3 and 4, relay one another so that the groups of grasping elements 15 are in phase opposition, i.e. so that when one belt 18, 19 with its four grasping elements 15 is stationary, on the side of the assembly machine 8, to allow bodies 1 to be loaded onto the mandrels of the assembly machine 8, the other belt 19, 18 is in the process of collecting the bodies originating from the wheel 9.

It is important to emphasize the importance of the orientation of the rotary conveyor 17, particularly of the direction about which the belts 18, 19 turn. The aforementioned angles of 45° make it possible to obtain a change of orientation of 90° for the bodies 1.

Figure 5:
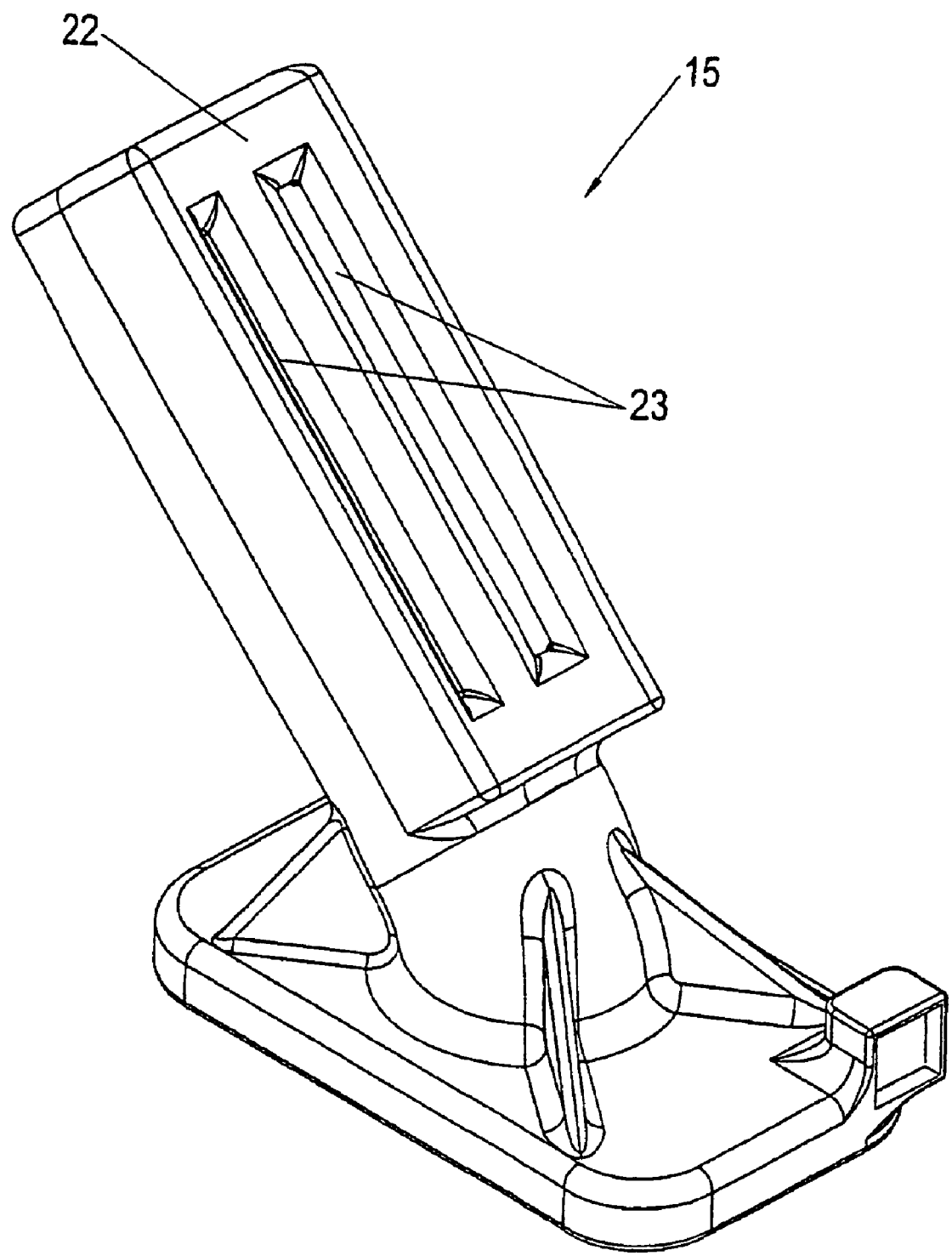
FIG. 5 shows a grasping element.

A grasping element 15 is illustrated in FIG. 5. Its shape approximately resembles a rectangular parallelepiped of which one face, the grasping face 22, is convex. Its curvature is roughly the same as the external curvature of the bodies 1, so that the two respective surfaces are in close contact. The grasping face 22 has two openings 23 which are connected, through the belts 18, 19 which are perforated at the point where the grasping elements 15 are attached, to a suction system and to a blowing system. To install a vacuum through the openings 23 when the bodies 1 have to be fixed to the grasping elements 15 or to blow through the openings 23 when the bodies 1 have to be released from the grasping elements 15, there are two sealed compartments inside the rotary conveyor 17, each compartment being placed in communication with a belt 18, 19, i.e. with a group of grasping elements 15, the compartments are connected to a suction system and to a blowing system via openings 20 arranged on the sides of the rotary conveyor 17.

Thus, when one group of grasping elements 15 is picking up the bodies 1, a vacuum is installed in each grasping element 15. At the same time, the other group of grasping elements 15 is releasing the bodies 1 and blowing is performed into each grasping element 15.

It goes without saying that the invention is not restricted to the example described hereinabove. For example, it is not necessary to use gripping systems which operate on suction.

Likewise, the wheel may be replaced by any other gripping system allowing the bodies to be conveyed towards the grasping elements of the belts.

The belts themselves could possibly be replaced by a system of chains to which the grasping elements would be fixed.

The invention claimed is:

1. Installation for assembling tube components comprising bodies (1) with shoulders, comprising the following elements arranged in succession: a linear body conveyor (4), a transfer system (7) designed to apply a change in orientation to the bodies (1) of about 90°, an assembly unit (8) for fixing the shoulders to the bodies (1), characterized in that the transfer system (7) consists of a device (9) for gripping the bodies and of a device (17) for changing the orientation of the bodies, the orientation-change device comprising a rotary conveyor (17), of the conveyor belt type, which is arranged at right angles to the direction of the linear conveyor (4), the said rotary conveyor (17) comprising a belt (18, 19) rotating about a direction that makes an angle of about 45° with the direction of the linear conveyor (4), the belt (18, 19) comprising elements (15) for grasping the bodies, the shape of which is designed so that the bodies (1) are initially grasped on one of the sides of the rotary conveyor (17), in a direction parallel to that of the linear conveyor (4), and that they undergo a change in orientation by 90° when they pass to the other side of the rotary conveyor (17).

2. Installation according to claim 1, characterized in that the said grasping elements (15) are of roughly parallelepipedal shape, of which one face, the grasping face (22), is convex and comprises at least one opening (23) connected to a suction system, the curvature of the grasping face (22) being roughly the same as the curvature of the external surface of the bodies (1), the grasping elements (15) being oriented in a direction that makes an angle of about 45° with the surface of the belt (18, 19).

3. Installation according to claim 2, characterized in that the said opening (23) is also connected to a blowing system.

4. Installation according to claim 1, characterized in that the rotary conveyor (17) comprises two belts (18, 19) arranged in parallel, each belt (18, 19) comprising a group of body-grasping elements (15), the rotary conveyor (17) being designed so that the said groups are arranged in phase opposition.

5. Installation according to claim 1, characterized in that the body-gripping device comprises a wheel (9) provided with a number of gripping elements (10), the linear conveyor (4) being arranged near the wheel (9) at a tangent to it, the region (21) thus defined representing the site at which the bodies (1) are gripped, the gripping elements (10) being arranged in a direction parallel to that of the linear conveyor (4).

6. Installation according to claim 5, characterized in that the gripping elements (10) comprise a number of suction cups (24) connected to a suction system.

7. Installation according to claim 6, characterized in that the suction cups (24) are also connected to a blowing system.

* * * * *